US 7,434,009 B2

(12) United States Patent
Godin et al.

(10) Patent No.: US 7,434,009 B2
(45) Date of Patent: Oct. 7, 2008

(54) APPARATUS AND METHOD FOR PROVIDING INFORMATION TO A CACHE MODULE USING FETCH BURSTS

(75) Inventors: Kostantin Godin, Herzliya (IL); Moshe Anschel, Kfar Saba (IL); Yacov Efrat, Kfar Saba (IL); Zvika Rozenshein, Kfar Saba (IL); Ziv Zamsky, Ra'anana (IL)

(73) Assignee: Freescale Semiconductor, Inc., Austin, TX (US)

( * ) Notice: Subject to any disclaimer, the term of this patent is extended or adjusted under 35 U.S.C. 154(b) by 59 days.

(21) Appl. No.: 10/955,220

(22) Filed: Sep. 30, 2004

(65) Prior Publication Data
US 2006/0069877 A1  Mar. 30, 2006

(51) Int. Cl.
*G06F 9/38* (2006.01)
*G06F 12/08* (2006.01)

(52) U.S. Cl. .................... 711/150; 711/118; 710/35

(58) Field of Classification Search .......... 711/137, 711/168
See application file for complete search history.

(56) References Cited
U.S. PATENT DOCUMENTS

| | | | |
|---|---|---|---|
| 4,853,846 A | 8/1989 | Johnson | |
| 5,627,994 A * | 5/1997 | Levy et al. | 711/150 |
| 5,742,790 A | 4/1998 | Kawasaki | |
| 6,081,873 A | 6/2000 | Hetherington et al. | |
| 6,272,597 B1 | 8/2001 | Fu | |
| 6,490,652 B1 * | 12/2002 | Van Hook et al. | 711/118 |
| 6,892,281 B2 * | 5/2005 | Chaudhari et al. | 711/137 |
| 7,143,246 B2 * | 11/2006 | Johns | 711/146 |
| 2002/0069326 A1 | 6/2002 | Richardson | |
| 2004/0088490 A1 * | 5/2004 | Ghosh | 711/137 |
| 2004/0227765 A1 * | 11/2004 | Emberling | 345/582 |
| 2004/0268051 A1 * | 12/2004 | Berg et al. | 711/137 |
| 2005/0172091 A1 * | 8/2005 | Rotithor et al. | 711/157 |

* cited by examiner

*Primary Examiner*—B. James Peikari

(57) ABSTRACT

Apparatus and method for providing information to a cache module, the apparatus includes: (i) at least one processor, connected to the cache module, for initiating a first and second requests to retrieve, from the cache module, a first and a second data unit; (ii) logic, adapted to receive the requests and determine if the first and second data units are mandatory data units; and (iii) a controller, connected to the cache module, adapted to initiate a single fetch burst if a memory space retrievable during the single fetch burst comprises the first and second mandatory data units, and adapted to initiate multiple fetch bursts if a memory space retrievable during a single fetch burst does not comprise the first and the second mandatory data units.

19 Claims, 6 Drawing Sheets

APPARATUS AND METHOD FOR PROVIDING INFORMATION TO A CACHE MODULE USING FETCH BURSTS

FIELD OF THE INVENTION

The present invention relates to apparatuses and methods for providing information to a cache module, and especially to methods and apparatuses for retrieving data to a multiple-port cache module connected to multiple data buses.

BACKGROUND OF THE INVENTION

Cache modules are high-speed memories that facilitate fast retrieval of data. Typically, cache modules are relatively expensive and are characterized by a small size, especially in comparison to external memories.

The performance of modern processors based systems usually depend upon the cache module performances and especially to a relationship between cache hits and cache misses. A cache hit occurs when a data that is present in a cache module memory is requested. A cache miss occurs when the requested data is not present in the cache module and has to be fetched from another (usually external) memory.

Various cache module modules and processor architectures, as well as data retrieval schemes, were developed over the years, to meet increasing performance demands. These architectures included multi-port cache modules, multi-level cache module architecture, super scalar type processors and the like.

The following U.S patents and patent applications, all being incorporated herein by reference, provide a brief summary of some state of the art cache modules and data fetch methods: U.S. Pat. No. 4,853,846 of Johnson et al., titled "Bus expander with logic for virtualizing single cache control into dual channels with separate directories and prefetch for different processors"; U.S. patent application Ser. No. 20020069326 of Richardson et al., titled "Pipelines non-blocking level two cache system with inherent transaction collision-voidance"; U.S. Pat. No. 5,742,790 of Kawasaki titled "Detection circuit for identical and simultaneous access in a parallel processor system with a multi-way multi-port cache"; U.S. Pat. No. 6,081,873 of Hetherington et al., titled "In-line bank conflict detection and resolution in a multi-ported non-blocking cache"; and U.S. Pat. No. 6,272,597 of Fu et al., titled "Dual-ported, pipelined, two level cache system".

Typically, a processor that requests data from a cache module is stalled or halted until it receives the requested data. When multiple cache miss events occur simultaneously the requesting processor can be halted for a prolonged time period, due to the latency associated with multiple fetch operations.

There is a need to provide a system and method that can handle in an efficient manner multiple cache miss events.

SUMMARY OF THE PRESENT INVENTION

The invention provides an apparatus and method that performs fetch bursts and is capable of determining an amount of fetch bursts, as well as the size of fetch bursts.

The invention provides an apparatus and a method that determines an amount of fetch bursts in response to the locations of data units that simultaneously cause cache miss events.

The invention provides an apparatus and method that can reduce the amount of fetch bursts even when the two or more data units that caused simultaneous cache miss events have different addresses.

The invention provides an apparatus and a method that can reduce an amount of fetch bursts if a first and second data unit that caused a cache miss event belong to a memory space of predefined size. The size of that memory space can be equal to an amount of data that can be fetched during one or more fetch bursts.

The invention provides an apparatus for providing information to a cache module, the apparatus includes: (i) at least one processor, coupled to the cache module, for initiating a first and second requests to retrieve, from the cache module, a first and a second data unit; (ii) logic, adapted to receive the requests and determine if the first and second data units are mandatory data units; and (iii) a controller, coupled to the cache module, adapted to initiate a single fetch burst if a memory space of a predefined size includes the first and second mandatory data units, and adapted to initiate multiple fetch bursts if such a memory space does not include the first and the second mandatory data units.

Conveniently, the memory space of a predefined size is a memory space retrievable during one or more fetch bursts.

The invention provides a method for providing information to a cache module, the method includes: (i) receiving multiple requests to retrieve multiple information units to a cache module; (ii) determining a relationship between memory spaces retrievable during fetch bursts and locations of the multiple information units; and (iii) performing at least one fetch burst in response to the determination.

The invention provides a method for providing information to a cache module, the method includes: (i) receiving an indication that a retrieval of a first and second mandatory data units is required; (ii) performing a single fetch burst if a memory space of a predefined size comprises the first and second mandatory data units; (iii) performing multiple fetch bursts if a memory space of that predefined size does not include the first and the second mandatory data units.

The invention provides an apparatus for providing information to a cache module, the apparatus includes: (i) logic, adapted to generate an indication that a retrieval of a first and second mandatory data units is required; (ii) a controller, connected to the cache logic, adapted to receive the indication and in response to initiate a single fetch burst if a memory space of a predefined size includes the first and second mandatory data units; and initiate multiple fetch bursts if that memory space does not include the first and the second mandatory data units.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description related to multiple data fetch operations and to a data cache module. Those of skill in the art will appreciate that the disclosed systems and methods can be applied mutates mutandis to instruction retrieval, instruction cache module, and even to a combination of data and instruction retrieval and to cache modules that store both instructions and data.

The apparatus and method determine an amount of fetch bursts in response to the locations of a first and second data units that caused a cache miss event. If, both are located within a memory space of a predefined size the amount of fetch bursts can be reduced. Conveniently, the predefined size corresponds to an amount of data that can be retrieved during a single fetch burst. This is not necessarily so and this predefined size can be larger. For example the size can correspond to the size of a cache module line. For convenience of explanation it is assumed that the size corresponds to the amount of data that can be retrieved during a single fetch burst, and the memory space is referred to as a memory space retrievable during the single fetch burst.

Figure 1:
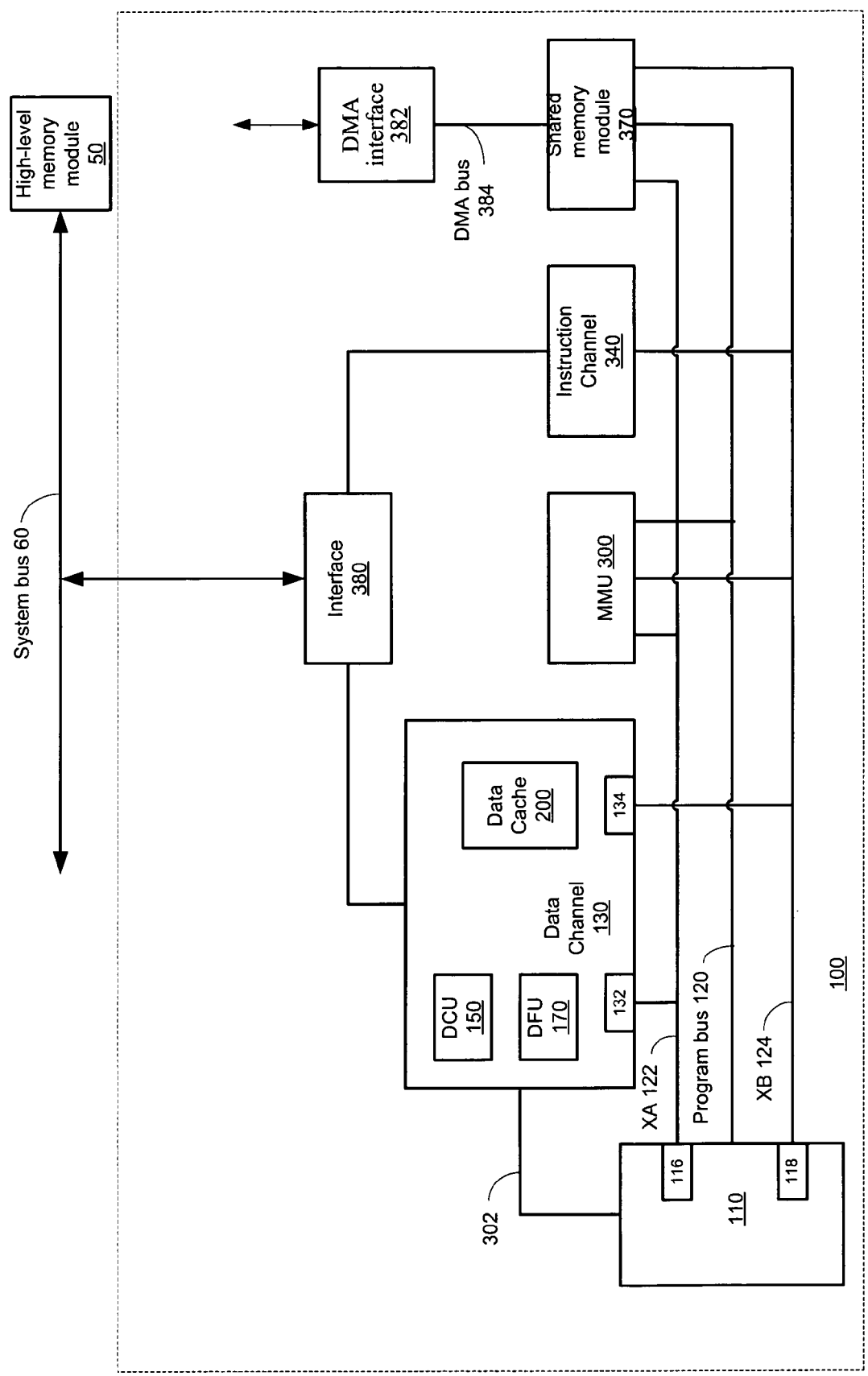
FIG. 1 is a schematic diagram of an apparatus, according to an embodiment of the invention.

FIG. 1 illustrates an apparatus 100, according to an embodiment of the invention. Apparatus 100 includes a processor 110, a data channel 130, a Memory Management Unit (MMU) 300, an instruction channel 340, a level-one RAM memory 370 as well as an interface unit 380. Apparatus 100 is connected to an additional memory module, such as, high-level memory module 50, via system bus 60.

Processor 110 and the instruction channel 340 are connected to a single program bus 120. Processor 110 has a first data port 116 and a second data port 118. The first data port 116 is connected, via a first data bus (XA) 122 to a first port 132 of the data channel 130, to the MMU 300 and to the level-one RAM memory 370. The second data port 118 is connected, via a second data bus (XB) 124 to a second port 134 of the data channel 130, to the MMU 300 and to the level-one RAM memory 370.

The data channel 130 is connected via a data fetch bus 126 to an interface 380 that in turn is connected the high-level memory module 50. It is noted that the additional memory can be a part of a multi-level cache architecture, whereas the data cache module 200 is the first level cache module and the additional memory is a level two cache memory. The additional memory can also be a part of an external memory that is also referred to as a main memory.

MMU 300 is adapted to supply program and data hardware protection, and to perform high-speed virtual address to physical address translation. MMU 330 is also capable of providing various cache and bus control signals. The virtual address is an address that is generated by processor 100 and as viewed by code that is executed by processor 110. The physical address is used to access the various memory banks.

Data channel 130 includes a data cache module 200, and multiple supporting units such as Data Fetch Unit (DFU) 170, multiple additional buffers (not shown) and Data Control Unit (DCU) 150. DFU 170 is responsible for data fetching and pre-fetching. Data fetching operations can include mandatory fetching operations and speculated fetching operations. Mandatory fetching operations include retrieving a data unit that caused a cache miss. Speculated fetching (also termed pre-fetching) operations include retrieving data units that did not cause a cache miss. Usually this latter type of data is expected to be used soon after the pre-fetch. This expectation is usually based on an assumption that many data requests are sequential in nature.

It is assumed that each fetch operation involves fetching a single basic data unit (BDU). Accordingly, a BDU that is fetched during a mandatory fetch operation is referred to as a mandatory BDU and a BDU that is fetched during a speculated fetch operation is referred to as a speculated BDU.

DCU 150 is responsible for arbitrating data access requests to the fetch data bus 126, generated by DFU 170 and the additional buffers. Typically, data fetch requests originating from the DFU 170 are given the highest priority.

Processor 110 is capable of issuing two data requests simultaneously, via buses XA 122 and XB 124. The data channel 130 processes these requests to determine if one or more cache hit occurred. Basically, the data channel 130 can decide that the two data requests resulted in a cache hit, the both request resulted in a cache miss or that one request resulted in a cache hit while the other resulted in a cache miss.

According to an embodiment of the invention processor 110 is stalled until all the data it receives all the data it requested, but this is not necessarily so. For example, according to another embodiment of the invention, only portions of the processor are stalled.

There are various manners for starting and ending the stalling stage. A cache miss can trigger an entrance to such a stage. It is assumed that processor 110 enters a stalled stage once it receives a cache miss indication from data channel 130. Processor 110 exits the stall stage once it receives an indication from the data channel 130 that the requested data is available. Line 302, connecting between processor 110 and data channel 130 conveys a stall signal that can cause processor 110 to enter a stalled stage and exit such a stage. It is noted that processor 110 can receive additional information, such as which of the data requests caused the cache miss.

Figure 2:
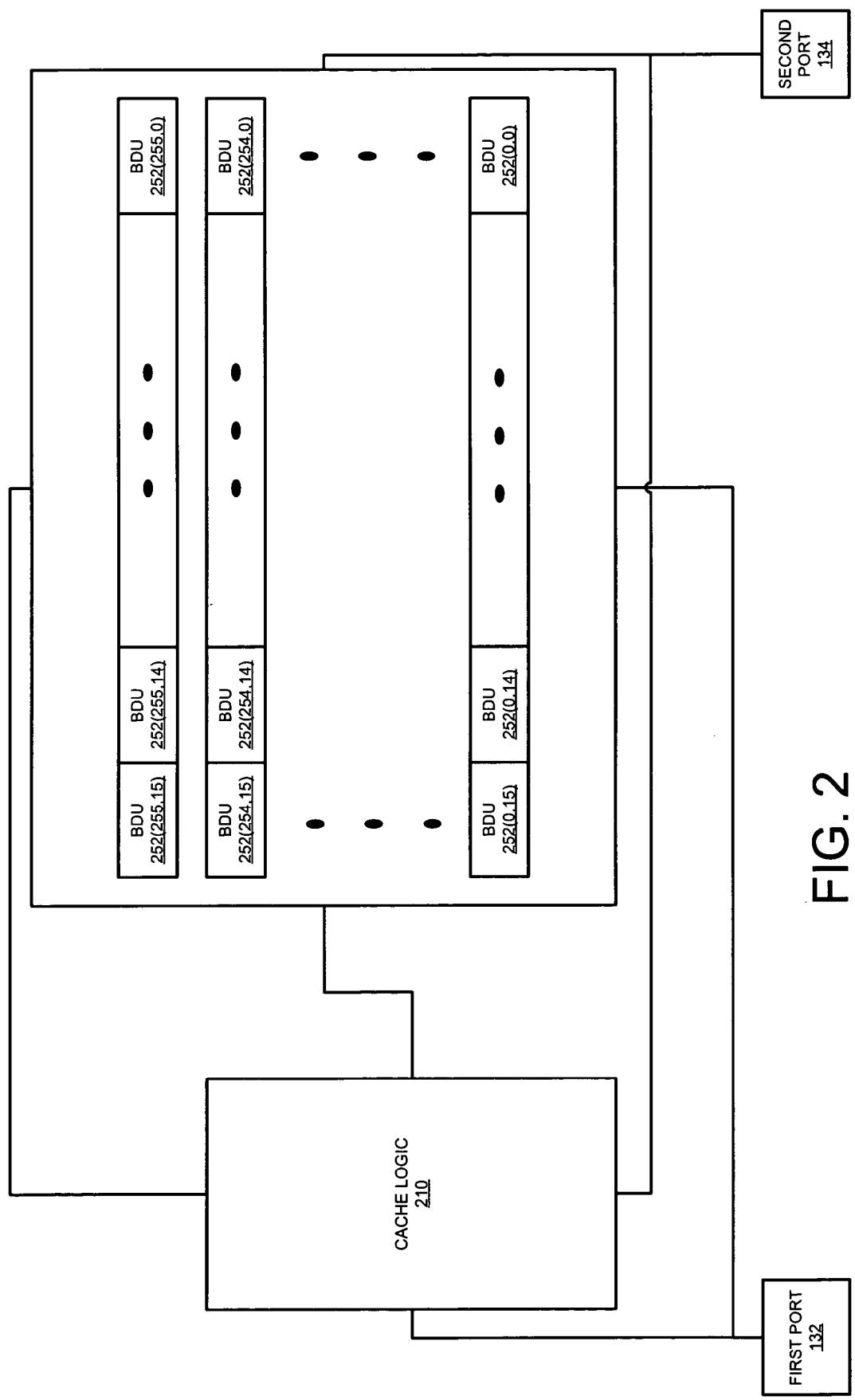
FIG. 2 is a schematic illustration of a data cache module, according to an embodiment of the invention.

FIG. 2 is a schematic illustration of data cache module 200, according to an embodiment of the invention. Data cache module 200 includes logic, such as cache logic 210 and cache memory bank 250. The cache memory bank 250 includes two hundred and fifty six lines 250(0)-250(255), each line includes sixteen 128-bit long basic data units. These basic data units (BDUs) are denoted 252(0,0)-252(255,15). A cache hit or cache miss is determined on a BDU basis. It is noted that the logic can be located outside the cache module, but this is not necessarily so.

Figure 3:
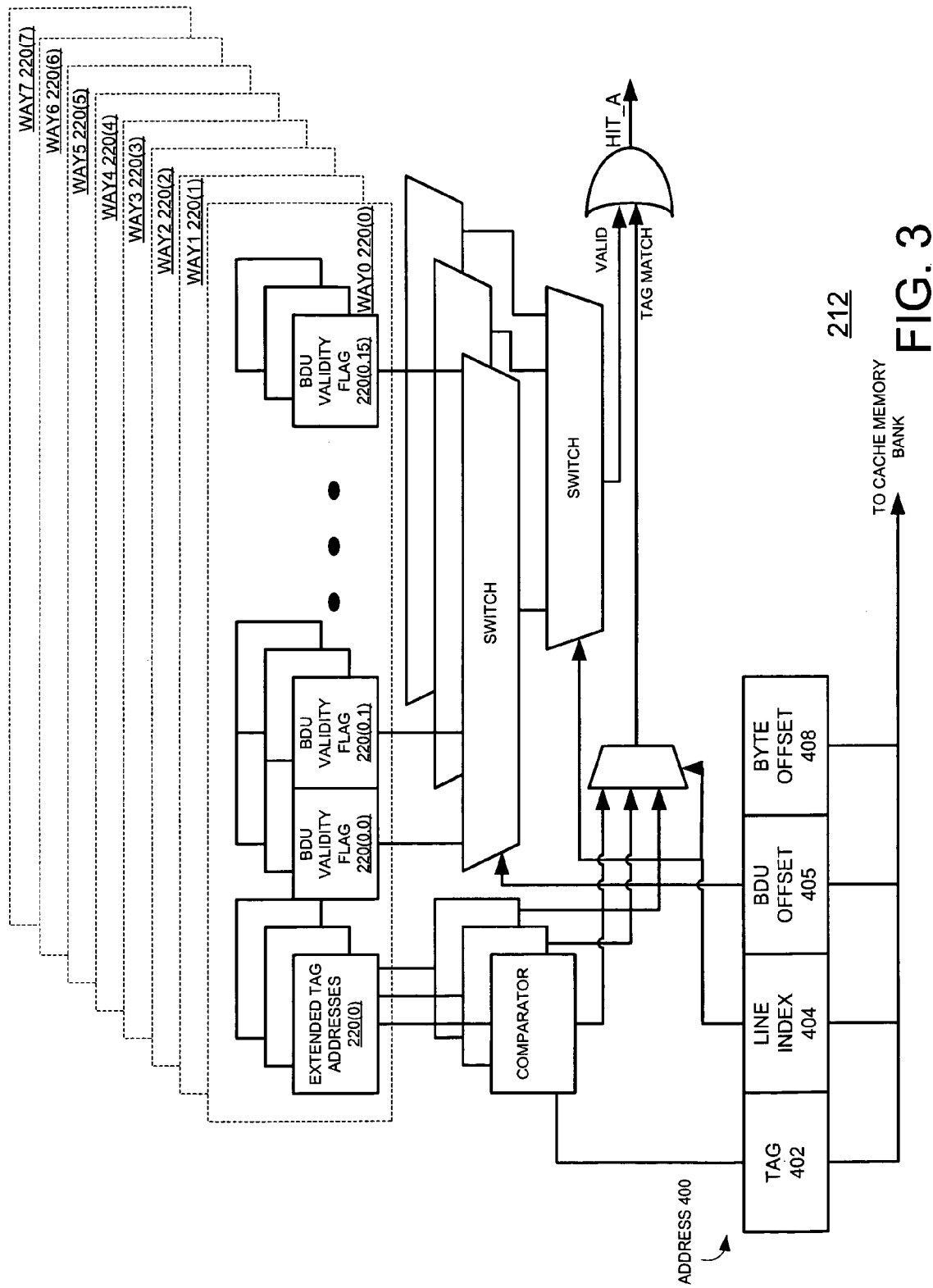
FIG. 3 is a schematic illustration of cache logic, according to an embodiment of the invention.

FIG. 3 is a schematic illustration of cache logic 210, according to an embodiment of the invention. The cache logic 210 is capable of managing two data requests simultaneously and includes two identical portions, 212 and 214, each is capable of determining whether a single cache hit or cache miss has occurred. For simplicity of explanation only a first portion 212 of the cache logic 210 is illustrated in detail.

The cache logic 210 includes eight ways denoted WAY0-WAY7 220(0)-220(7). Each way stores address and status information that is associated with thirty-two lines. The address information includes a tag address and the status information includes BDU validity and update information. For simplicity of information only WAY0 220(0) is illustrated in detail, while the other ways are represented by boxes 220(1)-220(7).

Each line is associated with an extended tag value and with sixteen BDU validity bits, representative of a validity of each BDU within that line. WAY0 220 stores sixteen extended tag addresses 220(0)-220(15), as well as sixteen sets of sixteen BDU validity flags 220(0,0)-220(15,15).

Each BDU can also be associated with dirty bits that indicate if a BDU was modified without being updated in a higher-level memory.

Once processor 110 provides a 32-bit address 400 over the first data bus XA 122 the first portion 212 of cache logic 210 processes this address, to determine whether the requested data is stored at the cache module (cache hit) or not (cache miss). If a cache hit occurs the requested data is sent to processor 110 over an appropriate data bus out of XA 122 or XB 124. Else, the DFU 170 is notified about the cache miss.

The address 400 is partitioned to a twenty bit tag address 402 that includes the twelve most significant bits of address 400, a 4-bit line index 404, a BDU offset 405 and a 4-bit byte offset 408. The 4-bit byte offset is used for data retrieval from the cache memory bank 250.

Each of the sixteen tag addresses 220(0)-220(15) stored within WAY0 220(0) is compared, in parallel, to the tag address 402. Those of skill in the art will appreciate that such a comparison takes place at all ways in parallel.

In addition, the BDU offset 405 and the 4-bit line index 404 are used to retrieve a validity flag that corresponds to the requested BDU. The 4-bit line index 404 is used for selecting a set of BDU validity flags out of the sixteen sets of WAY0 220(0), while the 4-bit BDU offset 405 is used for selecting a validity flag out of the selected set of BDU validity flags.

A cache hit occurs if there is a match between one of the stored tag addresses and the tag address and if the selected BDU is valid.

DFU 170 receives an indication of a cache hit and a cache miss. If both data requests resulted in a cache hit the DFU 170 is not required to perform a mandatory fetch. If only one of the data requests resulted in a cache miss the DFU 170 is required to perform a single mandatory fetch. If both data requests resulted in a cache miss the DFU 170 is required to perform one or more mandatory fetches.

According to an embodiment of the invention DFU 170 receives fetch characteristics that may affect the mandatory fetch operations. The fetch characteristics may include the predefined size of a memory space that may affect the fetching process (for example—the amount of data that can be retrieved at one or more fetch bursts, the size of fetch bursts, and the like.

These characteristics can reflect the size of buses on which data transfer occurs, the arrangement of external memory banks and the like. For example, a DRAM memory is typically arranged in DRAM rows. The content of a whole DRAM row can be fetched by a single fetch operation, thus fetching the content of a whole line can be useful. It is noted that apparatus 100 can be connected to multiple memory banks, via multiple buses, each having its own fetch characteristics.

The bus fetch bus 126 allows fetching a single BDU per fetch operation. A typical fetch burst includes four consecutive fetch operations, thus a total of four BDUs can be retrieved during a single fetch burst. It is noted that the amount of fetch operations per fetch bursts can be other than four.

Typically, memory modules that are adapted to perform fetch burst are partitioned to fixed sized data unit sets. A fetch burst that includes a request to receive a certain data unit will amount in a retrieval of that set. The order of fetched data units depends upon the specific requested data set.

Usually a single fetch burst can retrieve a consecutive memory space, even if the space is provided by applying a wrap around operation. If two mandatory BDUs are included within a single consecutive memory space it is very beneficial to perform a single fetch burst and not two, as two fetch bursts are more time consuming.

This is especially true in systems that do not allow a fetch burst to be interrupted. This efficient fetching scheme can reduce the processor stall period, especially as processor 110 is stalled until it receives both mandatory BDUs.

Once two cache miss occur simultaneously the DFU 170 has to determine if both mandatory BDUs can be fetched during a single fetch burst. If the answer is positive then such a fetch burst is initiated. Once the burst ends the mandatory BDUs are sent to processor 110, the processor 110 can exit the stall state.

According to an embodiment of the invention a fetch burst includes four fetch operations of four adjacent data units that belong to a certain data unit set. In other words, a single fetch burst can be utilized for retrieving a consecutive memory space. Thus, the DFU 170 has to determine if both mandatory BDUs are included within a single consecutive memory space.

The data cache module 200, and especially the cache logic 210, is connected to a controller, such as DFU 170, to provide indications about two cache events, by signals CACHE_A_HIT/MISS 201 and CACHE_B_HIT/MISS 203. The DFU 170 in turn may determine which fetch operations to execute and the like. The requests of the DFU 170, as well as requests from various supporting units, such as the WBB 180 to complete write back operations, and sent to DFU 170 that arbitrates between the various requests. These various components exchange fetch request and fetch acknowledgement signals. The CACHE_A_HIT/MISS 201 signal is asserted in response to an occurrence of a cache miss event associated with a request to retrieve data over the first data bus XA 122. This signal is negated when a corresponding cache hit event occurs. The CACHE_B_HIT/MISS 203 signal is asserted in response to an occurrence of a cache miss event associated with a request to retrieve data over the second data bass XB 124. This signal is negated when a corresponding cache hit event.

The data cache module 220 may also include buffering means connected to the first data bus XA 122, to the second data bus 124 and/or to the data fetch bus 126.

Figure 4:
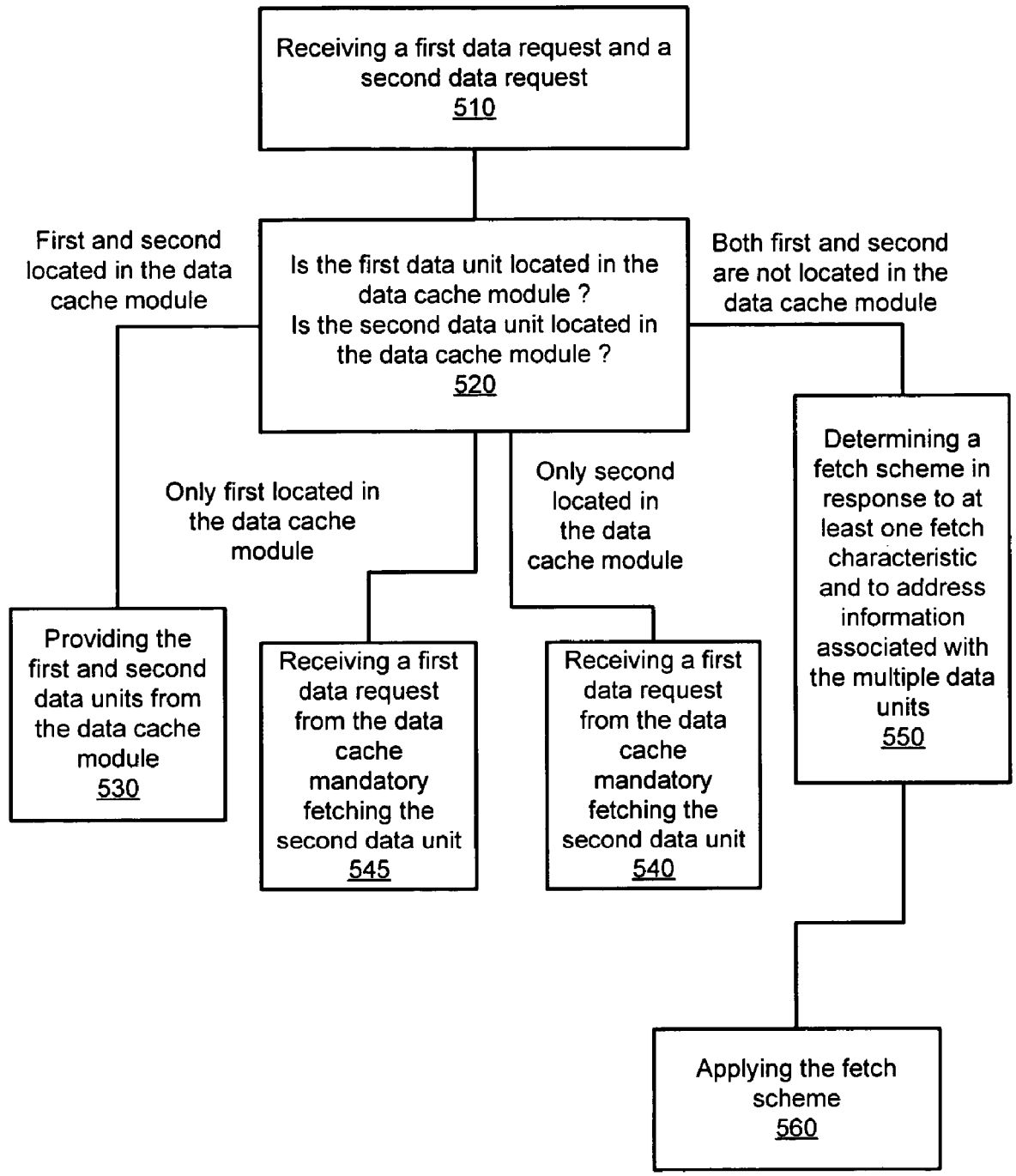
FIG. 4 is a flow chart of a method for data retrieval, according to an embodiment of the invention.

FIG. 4 is a flow chart of a method 500 for data retrieval, according to an embodiment of the invention.

Method 500 starts by stage 510 of receiving a first data request and a second data request. The first data request is a request to receive a first data unit that is associated with a first address. The second data request is a request to receive a second data unit that is associated with a second address. Referring to the example set forth in FIG. 3, processor 110 issues a first data request over first data bus XA 122 and a issues a second data request over second data bus XB 124.

Stage 510 is followed by stage 520 of determining if the first data unit is located within a data cache module and of determining if the second data unit is located within the data cache module. Referring to the example set forth in FIG. 3, cache logic 210 determines if the first data unit is stored in cache memory bank 250 and if the second data unit is stored in cache memory bank 250.

If both data units are located with the data cache module then stage 520 is followed by stage 530 of providing the first and second data units from the data cache module. Referring to the example set forth in FIG. 3, the first data unit (which is usually a portion of a BDU) is sent from cache memory bank 250 via first port 132 of data channel 130, over first data bus XA 122, to the first port 116 of the processor 110. The second data unit (which is usually a portion of a BDU) is sent from cache memory bank 250 via second port 134 of data channel 130, over second data bus XB 124, to the second port 118 of the processor 110.

If the first data unit is not located in the data cache module and the second data unit is located in the data cache module then stage 520 is followed by stage 540 of retrieving the second data unit from the cache module and performing a mandatory fetch operation to retrieve the first data unit from another memory. Referring to the example set forth in FIG. 3, while the data cache module 200 provides the second data unit to the second data bus XB 124, DFU 170 initiates a fetch burst that includes a mandatory fetch of a second BDU that includes the second data unit.

If the second data unit is not located in the data cache module and the first data unit is located in the data cache module then stage 520 is followed by stage 545 of retrieving the first data unit from the cache module and performing a mandatory fetch operation to retrieve the second data unit from another memory. Referring to the example set forth in FIG. 3, while the data cache module provides the first data unit to the first data bus XA 122, DFU 170 initiates a fetch burst that include a mandatory fetch of a first BDU that includes the first data unit.

If both first and second data units are not located within the data cache module then stage 520 is followed by stage 550 of determining a fetch scheme in response to at least one fetch characteristic and to address information associated with the multiple information units. The at least one fetch characteristic can reflect a size of fetched data unit, an optimal size of a fetched unit, an amount of fetch operations that can form a single fetch burst, fetch operation priority, whether the fetch burst can be interrupted, and the like. The fetch scheme can include equally sized fetch bursts or fetch bursts of different sizes. The amount of bursts can also vary according to the fetch characteristics.

A fetch scheme may include an amount and even size of data fetch operations, the BDUs to be fetched during each fetch operation, the amount of fetch bursts and the like. Conveniently, if during a single fetch burst both the first and second mandatory BDUs can be retrieved, then the fetch scheme includes that single fetch.

According to an embodiment of an invention each fetch burst can retrieve a certain consecutive memory space, thus stage 550 may include checking if both mandatory BDUs are included within a certain consecutive memory space. Thus, even if the first address differs from the second address, the amount of fetch operations can be reduced and the processor stall period can be decreased.

According to an embodiment of the invention the order of fetch operations is responsive to the location of the mandatory BDUs. For example—if a memory space memory space retrievable during the single fetch burst includes four BDUs and the second and third BDU are mandatory BDUs then the fetch burst will start by fetching the second BDU. The processor can receive these mandatory BDU before the fetch burst ends.

Referring to the example set forth in FIG. 1, DFU 170 determines the amount of fetch operations and/or fetch bursts required to retrieve the first and second data units. If both first and second data units are included within a single BDU than a single mandatory fetch operation is required. If DFU 170 operates on a fetch burst basis than such a fetch burst may include a mandatory fetch followed by speculative fetches. If the first and second data units are included within a single memory space that can be retrieved during a single fetch burst then that fetch burst include two mandatory fetches and two speculative fetches.

According to an embodiment of the invention the fetch scheme also includes speculative fetch. If two cache miss event occur the speculative fetch operations can be ordered in an interlaced manner.

Stage 550 is followed by stage 560 of applying the information fetch scheme. The outcome of said application is the retrieval of the first and second data units to the cache module or to the requesting entity.

According to an embodiment of the invention the speculative fetch operations are responsive to mandatory fetch operations and to a status of lines that include the mandatory BDUs. The status includes the amount of BDUs that are valid within that line and the location of non-valid BDUs.

Speculative fetch operations can be aimed to fetch speculative BDUs that belong to the same line as the mandatory BDUs. The speculative fetch operations are repeated until a line is filled or until a mandatory fetch operation is required.

The inventors found that interleaving speculative fetch operations is quite useful. The interleaving facilitates providing both cache miss events substantially the same treatment. In other words it introduce a certain amount of fairness in the fetching scheme. Thus, if before both lines are filled a mandatory fetch operation is required, both lines manage to receive substantially the same amount of speculative BDUs.

According to an embodiment of the invention the speculative fetch operations are responsive to additional parameters including the amount of non-valid BDUs within each of the lines, a priority assigned to a certain line and the like.

Figure 5:
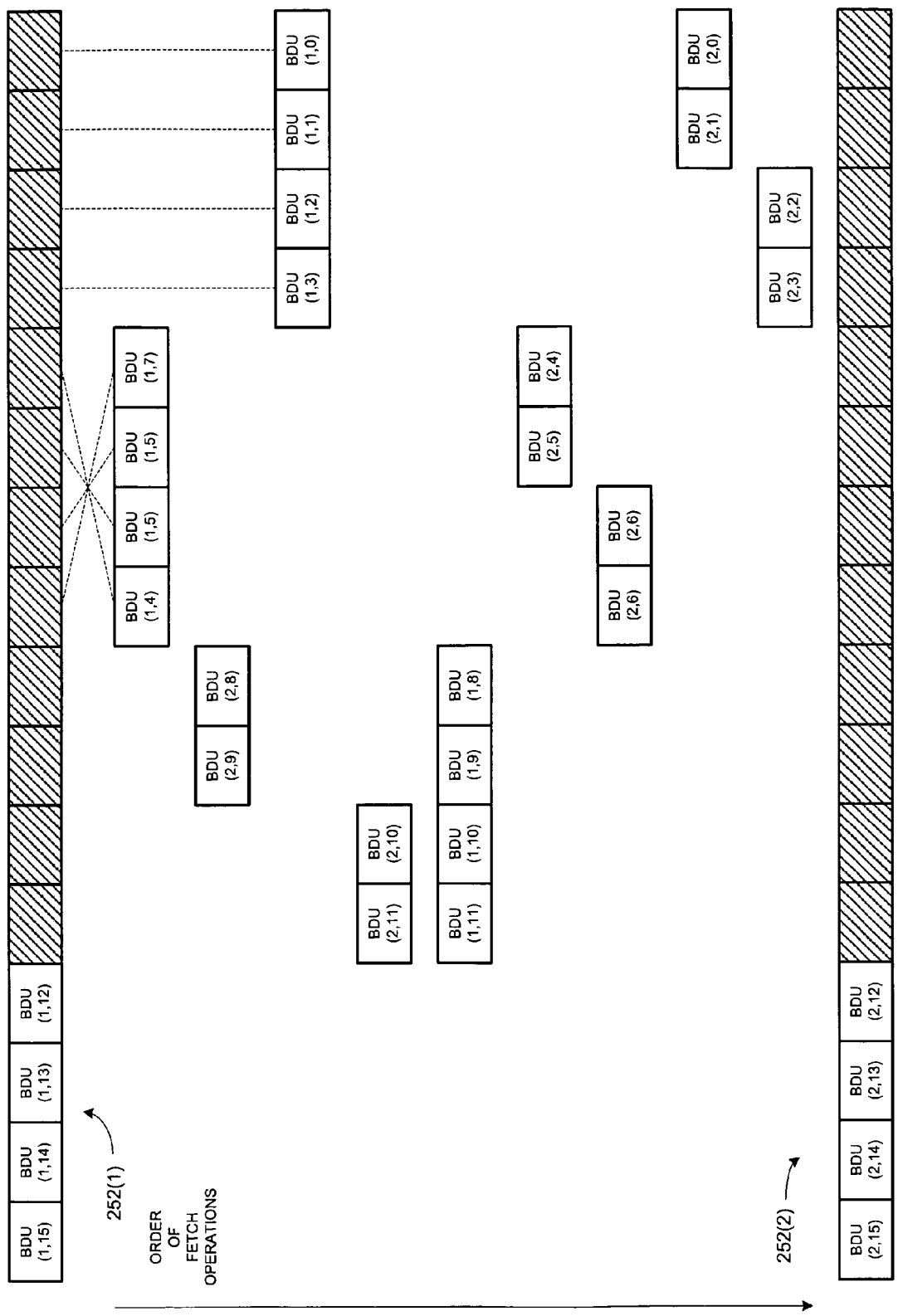
FIG. 5 is a schematic description of a first line and a second line, according to an embodiment of the invention.

FIG. 5 is a schematic description of a first line 252(1) and a second line 252(2), according to an embodiment of the invention. BDUs 252(1,121)-252(1,15) are valid and BDUs 252(1,0)-252(1,11) are not valid. BDUs 252(2,12)-252(2,15) are valid and BDUs 252(2,0)-252(2,11) are not valid. It is further assumed that the fetch burst size associated with the first line is four BDUs while the fetch burst size associated with the second line is two BDUs. It is further assumed that the fetching operations initiate after processor 110 requests BDU 252(1,4) and BDU (2,8) and that fetching BDUs from different lines requires separate fetch burst.

TABLE 1 and TABLE 2 illustrate various alternative exemplary sequences of fetch bursts. FIG. 5 includes an illustration of the fetch bursts of TABLE 1. The fetch bursts are denoted FB1-FB9 in that figure.

TABLE 1

| # | Mandatory fetch operation | First speculative Fetch operation | Second speculative fetch operation | Third speculative fetch operation |
|---|---|---|---|---|
| 1 | BDU 252(1, 4) | BDU 252(1, 5) | BDU 252(1, 6) | BDU(1, 7) |
| 2 | BDU 252(2, 8) | BDU 252(2, 9) | | |
| 3 | BDU 252(1, 0) | BDU 252(1, 1) | BDU 252(1, 2) | BDU(1, 3) |
| 4 | BDU 252(2, 10) | BDU 252(1, 11) | | |
| 5 | BDU 252(1, 8) | BDU 252(1, 9) | BDU 252(1, 10) | BDU(1, 11) |
| 6 | BDU 252(2, 4) | BDU 252(2, 5) | | |
| 7 | BDU 252(2, 6) | BDU 252(2, 7) | | |
| 8 | BDU 252(2, 0) | BDU 252(2, 1) | | |
| 9 | BDU 252(2, 2) | BDU 252(2, 3) | | |

TABLE 2

| # | Mandatory fetch operation | First speculative Fetch operation | Second speculative fetch operation | Third speculative fetch operation |
|---|---|---|---|---|
| 1 | BDU 252(1, 4) | BDU 252(1, 5) | BDU 252(1, 6) | BDU(1, 7) |
| 2 | BDU 252(2, 8) | BDU 252(2, 9) | | |
| 3 | BDU 252(2, 10) | BDU 252(2, 11) | | |
| 4 | BDU 252(1, 0) | BDU 252(1, 1) | BDU 252(1, 2) | BDU 252(1, 3) |
| 5 | BDU 252(2, 0) | BDU 252(2, 1) | | |
| 6 | BDU 252(2, 2) | BDU 252(2, 3) | | |
| 7 | BDU 252(1, 8) | BDU 252(1, 9) | BDU 252(1, 10) | BDU 252(1, 11) |
| 8 | BDU 252(2, 4) | BDU 252(2, 5) | | |
| 9 | BDU 252(2, 6) | BDU 252(2, 7) | | |

Figure 6:
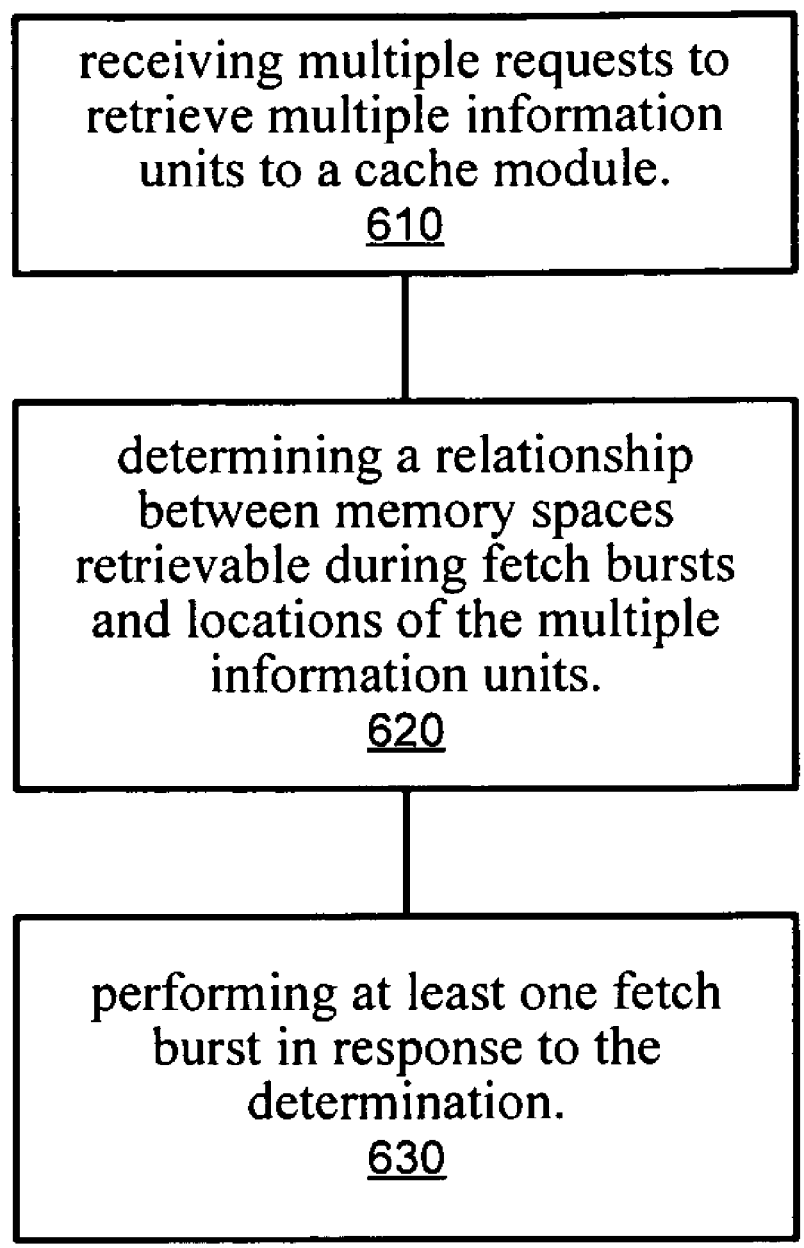
FIG. 6 is a flow chart of a method for providing information to a cache module, according to an embodiment of the invention.

FIG. 6 is a flow chart of method 600 for providing information to a cache module, according to an embodiment of the invention. Method 600 starts by stage 610 of receiving multiple requests to retrieve multiple information units to a cache module.

Stage 610 is followed by stage 620 of determining a relationship between memory spaces retrievable during fetch bursts and locations of the multiple information units. Stage 620 may include associating a memory space retrievable during a fetch burst with each of the multiple information units and searching for overlaps between these memory spaces. Once an overlap is located the amount of fetch bursts can be reduced. If for example two information units are within the same BDU then a single fetch operation can retrieve both. If two information units are located in different BDUs but these two BDUs are included within a single memory space retrievable during a fetch burst then there they are retrieved during a single fetch burst. The requests are usually received once multiple cache miss events occur.

According to an embodiment of the invention at least one characteristic of a memory space retrievable during a fetch burst is responsive to a location of said memory space. For example, the size of such memory space may be dependent upon the memory bank to which it belongs.

Stage 620 is followed by stage 630 of performing at least one fetch burst in response to the determination.

Usually, stage 630 includes mandatory fetch operations as well as speculative fetch operations. As illustrated in TABLE 1 and TABLE 2 speculative BDUs associated with different mandatory information units are fetched in an interlaced manner.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing information to a cache module, the method comprising the stages of: simultaneously receiving multiple requests to retrieve multiple mandatory information units to a cache module; determining, before fetching a first mandatory data unit and a second mandatory data unit whether the first mandatory unit and the second mandatory data unit can be fetched during a single fetch burst; performing a single fetch burst if a memory space retrievable during a single fetch burst comprises the first and second mandatory data units; and performing multiple fetch bursts if the memory space does not comprise the first and the second mandatory data units.

2. The method of claim 1 wherein the stage of receiving requests to retrieve multiple information units to a cache module is preceded by a stage of determining that multiple cache miss occur.

3. The method of claim 1 wherein the determining comprises determining at least one characteristic of a memory space retrievable during the single fetch burst in response to a location of the first mandatory data unit and in response to a location of the second mandatory data unit.

4. The method according to claim 3 wherein the determining comprises determining at least one characteristic selected from a group consisting of a size of the fetch burst and a starting address of the fetch burst.

5. The method of claim 1 further comprising performing speculative fetch operations.

6. The method of claim 1 wherein at least one fetch burst comprises a speculative fetch operation.

7. The method of claim 6 wherein speculative information units associated with different mandatory information units are fetched in an interlaced manner.

8. The method of claim 1 wherein speculative information units associated with different mandatory information units are fetched in an interlaced manner.

9. The method according to claim 1 wherein the determining comprises determining an order of fetch operations within a fetch burst in response to a location of at least one mandatory data unit out of the first and second mandatory data units.

10. An apparatus for providing information to a cache module, the apparatus comprises:
   logic, adapted to generate an indication that a retrieval of a first and second mandatory data units is required in response to a simultaneous reception of two data requests that results in cache misses
   a controller, coupled to the cache logic, adapted to receive the indication and in response to:
   determine, before initiating at least one fetch burst that comprises fetching a first mandatory data unit and a second mandatory data unit, whether the first mandatory unit and the second mandatory data unit can be fetched during a single fetch burst;
   initiate a single fetch burst if a memory space retrievable during a single fetch burst comprises the first and second mandatory data units; and initiate multiple fetch bursts if the memory space does not comprise the first and the second mandatory data units.

11. The apparatus of claim 10 wherein at least one characteristic of a memory space retrievable during a fetch burst is responsive to a location of said memory space.

12. The apparatus of claim 10 wherein the controller is further adapted to initiate speculative fetch operations.

13. The apparatus of claim 10 wherein at least one fetch burst comprises a speculative fetch operation.

14. The apparatus of claim 10 wherein the controller is adapted to initiate speculative fetch operations associated with different mandatory fetch operation in an interlaced manner.

15. The apparatus of claim 10 further comprising the cache module.

16. The apparatus of claim 15 wherein the cache module is coupled to the logic.

17. The apparatus according to claim 10 wherein the controller is adapted to determine at least one characteristic of a memory space retrievable during the single fetch burst in response to a location of the first mandatory data unit and in response to a location of the second mandatory data unit.

18. The apparatus according to claim 17 wherein the controller is adapted to determine at least one characteristic selected from a group consisting of a size of the fetch burst and a starting address of the fetch burst.

19. The apparatus according to claim 10 wherein the controller is adapted to determine an order of fetch operations within a fetch burst in response to a location of at least one mandatory data unit out of the first and second mandatory data units.

* * * * *